J. P. ZONNE.
Harness-Saddles.

No. 224,503.      Patented Feb. 10, 1880.

Witnesses
Fred G. Dieterich
John Ericson

Inventor
John P. Zonne
by Louis Bagger & Co.
Attorneys

UNITED STATES PATENT OFFICE.

JOHN P. ZONNE, OF SHEBOYGAN FALLS, WISCONSIN.

HARNESS-SADDLE.

SPECIFICATION forming part of Letters Patent No. 224,503, dated February 10, 1880.

Application filed September 6, 1879.

*To all whom it may concern:*

Be it known that I, JOHN P. ZONNE, of Sheboygan Falls, in the county of Sheboygan and State of Wisconsin, have invented certain new and useful Improvements in Harness-Saddles; and I do hereby declare that the following is a full, clear, and exact description of the invention, which will enable others skilled in the art to which it appertains to make and use the same, reference being had to the accompanying drawings, which form a part of this specification, and in which—

Figure 1:
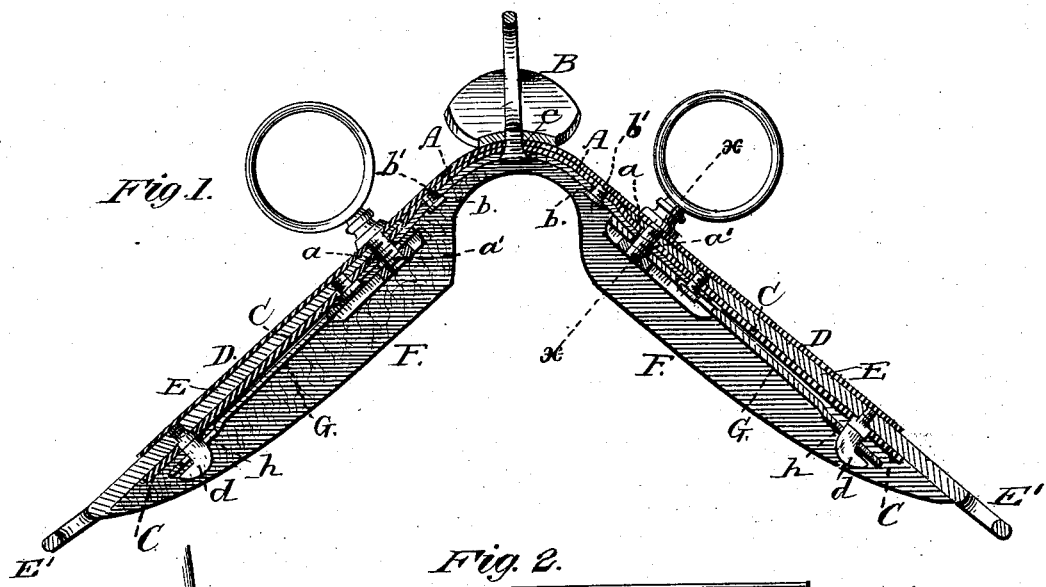
Figure 2:
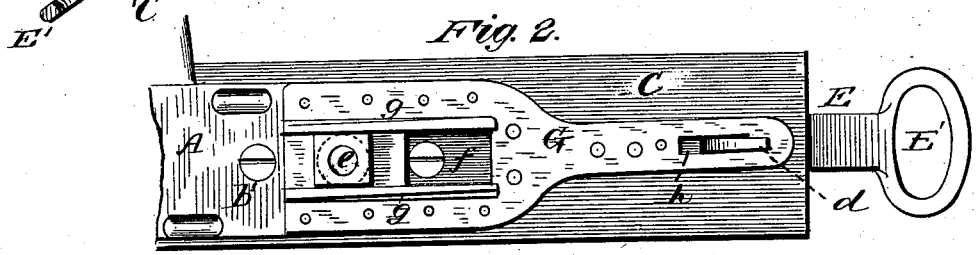
Figure 3:
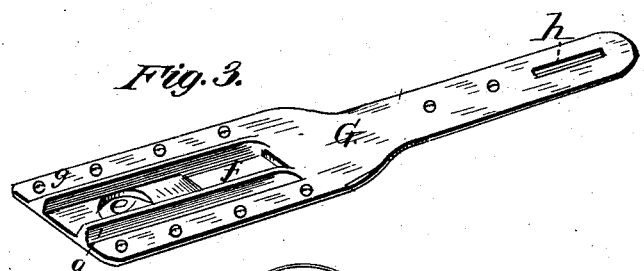
Figure 4:
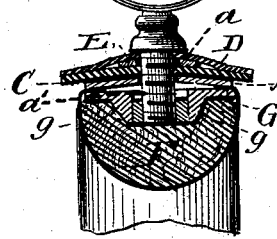

Figure 1 is a longitudinal section of a harness-saddle embodying my improvements. Fig. 2 is a view of the under side of one-half thereof, the pad having been removed. Fig. 3 is a perspective view of the under side of the flanged pad-plate; and Fig. 4 is a cross-section of the pad, skirt, and tree, taken on line $x\,x$ of Fig. 1.

Similar letters of reference indicate corresponding parts in all the figures.

This invention relates to harness-saddles or gig-tree attachments; and it consists in the detailed construction and combination of the tree, skirt, back-band loop, and pad, as hereinafter described, and particularly pointed out in the claims.

In the drawings, A is the tree, which is provided with terret-holes $a\,a$ and screw-holes $b\,b$, and with a seat, B, which is secured upon the middle of the tree by a screw, $c$. C is the skirt, which is made with a housing or jockey, D, upon its upper side. This housing is not stitched upon the skirt at its lower end, but is left open so as to form a pocket for the insertion of the strap E of the back-band loop E', which is made of iron or other suitable metal in one piece with its shank or strap E.

The skirt is secured upon the tree by clamping its upper end between the tree and the saddle, as shown in Fig. 1, and by the loop-strap E, which is inserted into the pocket formed between the skirt and its housing until the hole in its upper end corresponds or registers with the terret-hole $a$ in that side of the tree and with the terret-hole in the skirt and housing, so that the nutted shank $a'$ of the terret will bind the whole firmly together. It is further secured upon each side of the tree by the screw $b'$, inserted through the upper screw-hole, $b$, and by a hooked screw, $d$, the hooked head of which clamps the skirt between itself and the loop-strap E.

The pad F is provided with a pad-plate, G, made with two parallel flanges, $g\,g$, on its under side, between which are the perforations or openings $e\,f$, one of which, $e$, is for the insertion of the terret-shank, while the other, $f$, is for the insertion of the terret-nut into the pad through the top of the plate. Thus the perforated flanged part of the plate forms a box for the terret-nut, preventing it from turning in its seat as well as from wearing the pad.

The lower part of the pad-plate G is made narrow and provided with a slot, $h$, which, when the pad is in proper position upon the under side of the tree and skirt, will register with the hooked head of screw $d$, upon which it is inserted, and which serves to hold it, with the pad, in place.

By the construction and combination of parts as described several important advantages are gained.

In the first place, the several parts are secured together by screws, so that they may be readily taken apart for repair, cleaning, or the changing or substitution of parts.

Secondly, the skirt is held firmly upon the tree, and is stiffened by the insertion of the shank of the back-band loop, in the manner described.

Thirdly, the pad and pad-plate, while held firmly upon the tree and skirt, may be readily detached therefrom, when desired.

Again, by the construction of the skirt and its housing or jockey, as set forth, the latter may be sewed upon the former by machine in a cheaper, better, and more expeditious manner than when done by hand, as usual.

Having thus described my invention, I claim and desire to secure by Letters Patent of the United States—

1. In a harness-saddle, the combination, with the tree A and detachable metallic back-band straps E E, of a skirt, C, provided with a pocket formed by its housing D, to receive the said metallic straps E E, substantially as set forth.

2. In a harness-saddle, the pocketed skirt C D, in combination with the tree A, metallic straps E E, pad-plates G, and screws $a'$ $b'$ $d$, the whole constructed and combined substantially as and for the purpose herein shown and specified.

In testimony that I claim the foregoing as my own I have hereto affixed my signature in presence of two witnesses.

JOHN PETTER ZONNE.

Witnesses:
   JOHN C. FAIRWEATHER,
   A. W. WHITCOM.